US012801518B2

(12) United States Patent
Landy et al.

(10) Patent No.: US 12,801,518 B2
(45) Date of Patent: Nov. 17, 2026

(54) SYSTEM AND METHOD TO DYNAMICALLY ANALYZE REPRESENTATIVE APPLICATION DATA

(71) Applicant: Bank of America Corporation, Charlotte, NC (US)

(72) Inventors: Marci Landy, Waxhaw, NC (US); Olga Caroline Kocharyan, Matthews, NC (US); Jarrod Jacobs, Charlotte, NC (US); Harry Douglas Kirby, Tega Cay, SC (US); Greshen Gavin Venketasamy, Accokeek, MD (US); Robert A Levandowski, North Granby, CT (US); Oyemuyiwa A Olatunji, Hornchurch (GB); Christopher Sitter, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 271 days.

(21) Appl. No.: 18/667,682

(22) Filed: May 17, 2024

(65) Prior Publication Data

US 2025/0355792 A1 Nov. 20, 2025

(51) Int. Cl.
*G06F 11/3698* (2025.01)

(52) U.S. Cl.
CPC .... *G06F 11/3698* (2025.01); *G06F 2201/815* (2013.01)

(58) Field of Classification Search
CPC ............. G06F 11/3668; G06F 11/3698; G06F 2201/815
See application file for complete search history.

(56) References Cited

U.S. PATENT DOCUMENTS

| | | | | |
|---|---|---|---|---|
| 8,019,583 | B1 * | 9/2011 | Sturrock | G05B 17/02 703/13 |
| 8,204,734 | B2 * | 6/2012 | Zaki | G06F 8/30 703/22 |

(Continued)

FOREIGN PATENT DOCUMENTS

| | | | |
|---|---|---|---|
| EP | 2084605 | B1 | 2/2018 |
| GB | 2467712 | A | 8/2010 |
| GB | 2609701 | A | 2/2023 |

*Primary Examiner* — Marina Lee

(57) ABSTRACT

An apparatus comprises a memory communicatively coupled to a processor. The processor is configured to generate a representative application in a simulation environment based at least in part upon an application data. The processor is further configured to execute the machine learning algorithm to perform one or more obfuscation operations configured to at least partially replace application information of the application data with simulation information of a specific data type; purge the application information from the simulation environment; simulate multiple application operations by the representative application using the simulation information; determine whether the simulated application responses comprise an output that is different from any of those in expected application responses in response to monitoring the simulated application responses during simulation of the application operations; and determine a modification suggestion to multiple application configuration parameters of the application configured to inhibit the output in response to determining the output.

20 Claims, 2 Drawing Sheets

(56) References Cited

U.S. PATENT DOCUMENTS

| | | | |
|---|---|---|---|
| 8,839,246 | B2 | 9/2014 | Fitzgerald et al. |
| 8,850,433 | B2 | 9/2014 | Fitzgerald et al. |
| 8,972,987 | B2 | 3/2015 | Ciano et al. |
| 9,081,788 | B2 | 7/2015 | Bolte et al. |
| 9,418,234 | B2 | 8/2016 | Bacher et al. |
| 9,477,520 | B2 | 10/2016 | Fitzgerald et al. |
| 9,483,267 | B2 | 11/2016 | Gschwind et al. |
| 9,563,460 | B2 | 2/2017 | Fitzgerald et al. |
| 9,632,780 | B2 | 4/2017 | Heller |
| 9,846,774 | B2 * | 12/2017 | Alme ..................... G06F 21/566 |
| 9,852,001 | B2 | 12/2017 | Fitzgerald et al. |
| 9,880,837 | B2 | 1/2018 | Khazanchi et al. |
| 10,353,724 | B2 | 7/2019 | Fitzgerald et al. |
| 10,825,127 | B2 | 11/2020 | Mellempudi et al. |
| 11,693,804 | B2 | 7/2023 | Rosenbaum et al. |
| 11,886,779 | B2 * | 1/2024 | Mirabella ................ G06N 5/04 |
| 12,212,470 | B2 * | 1/2025 | Donthireddy ......... H04W 12/12 |
| 12,561,235 | B2 * | 2/2026 | Varan .................. G06F 11/3684 |
| 2023/0351542 | A1 | 11/2023 | Mellempudi et al. |
| 2024/0078130 | A1 | 3/2024 | Gopalan |
| 2025/0240652 | A1 * | 7/2025 | Mada ...................... H04L 41/16 |
| 2025/0355792 | A1 * | 11/2025 | Landy ................. G06F 11/3698 |

* cited by examiner

SYSTEM AND METHOD TO DYNAMICALLY ANALYZE REPRESENTATIVE APPLICATION DATA

TECHNICAL FIELD

The present disclosure relates generally to operation of a system configured to provide application data extraction and processing, and more specifically to a system and method to dynamically analyze representative application data.

BACKGROUND

Application penetration tests may be cyber-attacks against a device to check for vulnerabilities in one or more applications. The application penetration tests may be performed in emulation environments comprising low-level emulations of applications. The emulation environments in the device do not match application configurations to be released in production environments. In this regard, current application penetration tests are unlikely to find true vulnerabilities in applications because the versions of the applications tested are unlikely to include production environment configurations. Further, several resources may be wasted in an attempt to match vulnerabilities found in the emulation environments to versions of the application in production environments.

SUMMARY OF THE DISCLOSURE

In one or more embodiments, systems and methods are configured to dynamically analyze representative application data. The systems may be configured to execute one or more machine learning (ML) algorithms and use one or more artificial intelligence (AI) commands to virtualize applications in a production (PROD) release. In particular, the systems may be configured to virtualize each application in a PROD release into a simulation environment (e.g., a virtual machine) to perform one or more application operations without impacting the PROD release of the application. The one or more application operations may be PROD environment operations. The systems may be configured to perform the PROD operations in the simulation environment instead of evaluating lower-level environment (LLE) release data and/or affecting PROD release data. In some embodiments, application penetration tests performed using PROD release data may be configured to identify true vulnerabilities in applications because versions of applications evaluated include PROD environment configurations.

In one or more embodiments, the systems may be configured to copy a PORD release version of an application onto a simulation environment. The copy of the PROD release version may comprise PROD release data (e.g., application data). At this stage, the systems may be configured to mask, obfuscate, and/or replace the PROD release data with simulation information. The simulation information may comprise data representative of the PROD release data. In this regard, the simulation information may comprise data matching data types in the PROD release data. In some embodiments, the PROD release data is masked, obfuscated, and/or replaced with simulation information to match a corresponding data type format. For example, if the PROD release data comprises user data including user addresses, then the simulation information may be generated by the systems to include randomized words in address formats. In this example, if a street address in the PROD release data is "1234 Example Street," then a street address in the simulated information may be "9319 Address Street." The PROD release data may be masked, obfuscated, and/or replaced in accordance with one or more rules and policies. The rules and policies may indicate a format, order, and/or configuration parameters to follow while masking, obfuscating, and/or replacing PROD release data.

In one or more embodiments, the system and method described herein are integrated into a practical application of testing PROD versions of applications in a sandbox simulation environment where changes to a simulation of the application do not affect the applications and the application data. For example, the systems and methods may be configured to be integrated in a release cycle process without requiring any downtime of the applications. Further, the application data is masked, obfuscated, and/or replaced multiple times with alternative simulation information to inhibit application data from being used in the simulation environment. In this regard, the systems and methods facilitate stability of any systems related to the application during release cycle validation ahead of releases or deployments. In some embodiments, the systems and methods evaluate real time application operations in a representative application of the applications, which inhibit any changes to the applications from being deployed with breakpoints or failures. In some embodiments, significant human resources, processing resources, and memory resources may be saved when an application is updated after evaluating and fixing any issues in a PROD release version of the application. In some embodiments, the systems and methods inhibit a server from going into a hung state or from being unresponsive because the server does not take PROD release versions of the applications offline.

In one or more embodiments, the systems and methods are directed to improvements in computer systems. Specifically, the systems and methods reduce processor and memory usage in a server by automatically performing tests and/or evaluations in a representative version of an application instead of performing analyses and/or changes to a PROD release version of the application. In this regard, the systems and methods are configured to update application configuration information after evaluating and fixing issues in the representative version of the application without manually identifying or analyzing the operations of the application in alpha or beta releases. In some embodiments, the systems and methods provide a plugin tool that enables analysis of application operations under multiple circumstances without affecting or impacting the application and/or the application data.

In one or more embodiments, the methods may be performed by an apparatus, such as the server. Further, the systems may comprise the apparatus. In addition, the methods may be performed as part of a process performed by the apparatus. As a non-limiting example, the apparatus may comprise a memory communicatively coupled to a processor. The memory may be operable to store application data of an application comprising one or more application data types, a machine learning algorithm configured to evaluate the application data in accordance with one or more machine learning models, and multiple application responses comprising one or more expected outputs of one or more application operations to be performed by the application. The processor may be configured to generate a representative application in a simulation environment based at least in part upon the application data. The representative application may be an isolated virtual representation of the application. The representative application may comprise application information of a specific data type. The representative application may be configured to simulate one or more application operations without impacting the application. The processor may be configured to, in response to generating the representative application, execute the machine learning algorithm to perform one or more obfuscation operations configured to at least partially replace the application information with simulation information of the specific data type, purge the application information from the simulation environment, simulate multiple application operations by the representative application using the simulation information, monitor multiple simulated application responses during simulation of the application operations, determine whether the simulated application responses comprise an output that is different from any of those in the expected application responses in response to monitoring the simulated application responses during simulation of the application operations, and determine a modification suggestion to multiple application configuration parameters of the application configured to inhibit the output in response to determining the output. The processor may be configured to generate a report indicating one or more instructions to incorporate the modification suggestion into the application configuration parameters.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
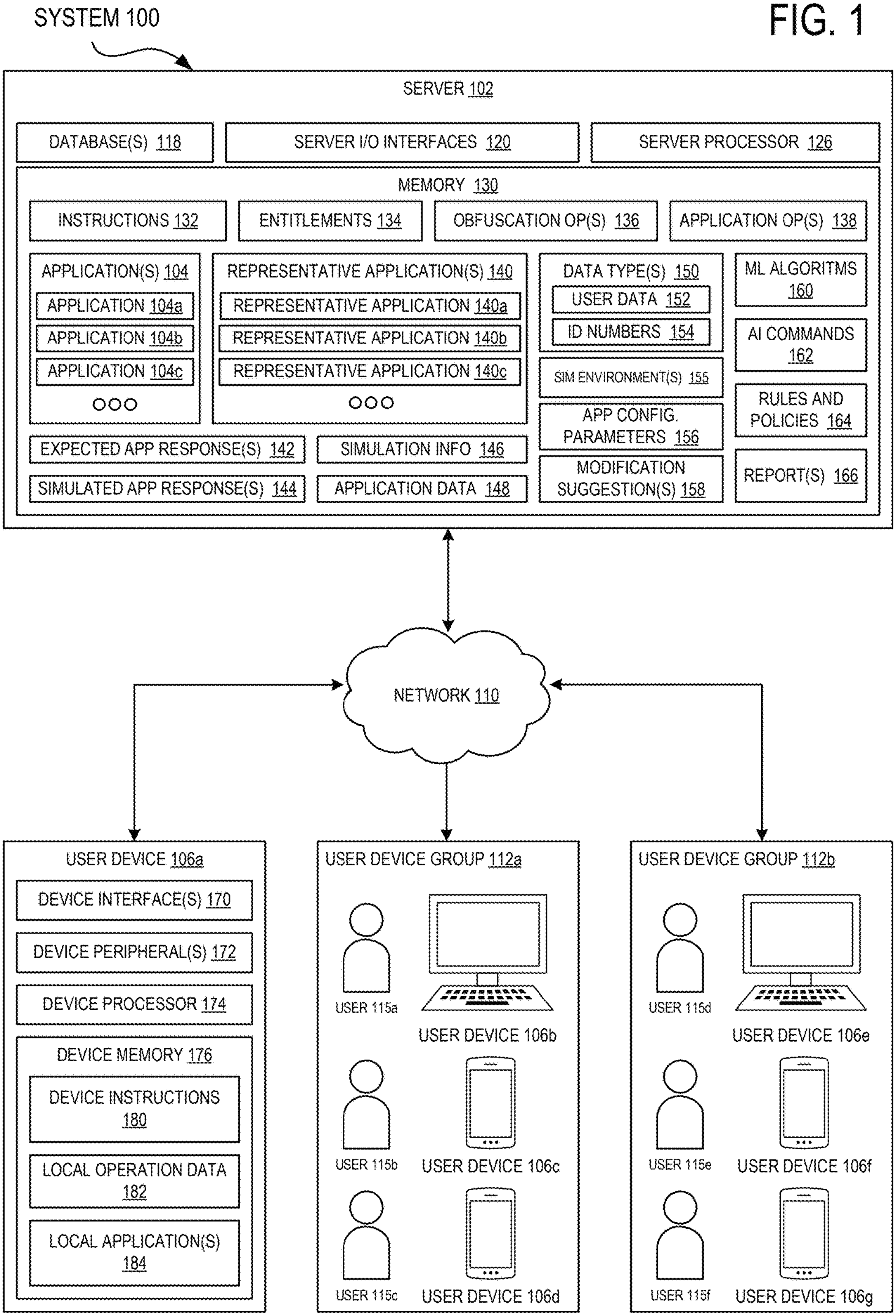
FIG. 1 illustrates a system in accordance with one or more embodiments.
Figure 2:
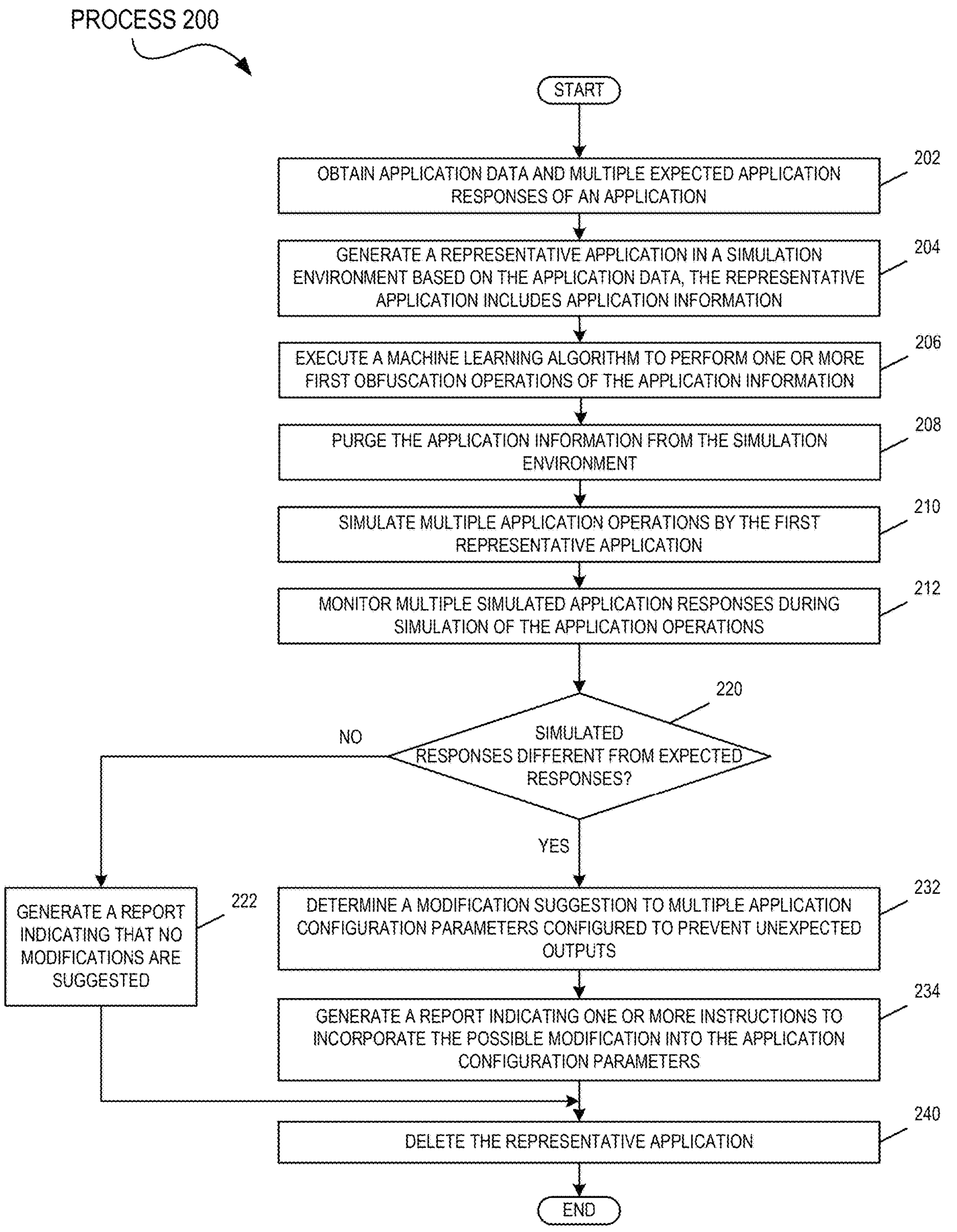
FIG. 2 illustrates an example flowchart of a method to dynamically analyze representative application data.

As described above, this disclosure provides various systems and methods to analyze metadata of an application. FIG. 1 illustrates a system 100 in which a server 102 evaluates representative application data of an application 104. FIG. 2 illustrates a process 200 performed by the system 100 of FIG. 1.

System Overview

FIG. 1 illustrates a system 100 configured to analyze representative application data associated with one or more applications 104. In the system 100 of FIG. 1, a server 102 is communicatively coupled to multiple user devices 106*a*-106*g* (collectively, user devices 106) via a network 110. In some embodiments, the user device 106*a* is a standalone device, the user device 106*b*, the user device 106*b*, and the user device 106*c* may be incorporated in a user device group 112*a*, and the user device 106*d*, the user device 106*e*, and the user device 106*g* may be incorporated in a user device group 112*b*. Each of the user device 106*b*, the user device 106*c*, the user device 106*d*, the user device 106*e*, the user device 106*f*, and the user device 106*g* may be operated by a user 115*a*, a user 115*b*, a user 115*c*, a user 115*d*, and a user 115*f*, respectively. The user device groups 112 may comprise less or more user devices 106 than those shown in FIG. 1.

In one or more embodiments, the server 102 comprises the databases 118, a server input (I)/output (O) interfaces 120, at least one server processor 126 comprising a processing engine (not shown), and a memory 130. In some embodiments, the databases 118 may be standalone memory storage units or part of the memory 130. In some embodiments, the memory 130 may comprise instructions 132, one or more entitlements 134, one or more obfuscation operations 136, one or more application operations 138, the one or more applications 104, one or more representative applications 140, one or more expected application responses 142, one or more simulated application responses 144, simulation information 146, application data 148, one or more data types 150 comprising user data 152 and one or more identification (ID) numbers 154, one or more simulation environments 155, one or more application configuration parameters 156, one or more modification suggestions 158, one or more machine learning (ML) algorithms 160, one or more artificial intelligence (AI) commands, one or more rules and policies 164, and one or more reports 166.

Referring to the user device 106*a* as a non-limiting example, the user devices 106 may comprise one or more device interfaces 170, one or more device peripherals 172, a device processor 174, and a device memory 176. The device memory 176 may comprise multiple device instructions 180, multiple local operation data 182, and one or more local applications 184.

System Components

Server

The server 102 is generally any device or apparatus that is configured to process data and communicate with computing devices (e.g., the user devices 106), additional databases, systems, and the like, via the one or more server I/O interfaces 120 (i.e., a user interface or a network interface). The server 102 may comprise the server processor 126 that is generally configured to oversee operations of the processing engine. The operations of the processing engine are described further below in conjunction with the system 100 described in FIG. 1, and the process 200 described in FIG. 2.

The server 102 comprises multiple databases 118 configured to provide one or more memory resources to the server 102 and the user devices 106. The server 102 comprises the server processor 126 communicatively coupled with the databases 118, the server I/O interfaces 120, and the memory 130. The server 102 may be configured as shown, or in any other configuration. In one or more embodiments, the databases 118 are configured to store data that enables the server 102 to configure, manage and coordinate one or more middleware systems. In some embodiments, the databases 118 store data used by the server 102 to function as a halfway point in between applications 104 and other tools or databases.

In one or more embodiments, the server I/O interfaces 120 may be configured to enable wired and/or wireless communications. The server I/O interfaces 120 may be configured to communicate data between the server 102 and other user devices (i.e., the user devices 106), network devices (i.e., routers in the network 110), systems, or domain(s) via the network 110. For example, the server I/O interfaces 120 may comprise a WI-FI interface, a LAN interface, a WAN interface, a modem, a switch, or a router. The server processor 126 may be configured to send and receive data using the server I/O interfaces 120. The server I/O interfaces 120 may be configured to use any suitable type of communication protocol. In some embodiments, the server I/O interfaces 120 may be an admin console comprising a display configured to show a user interface used to manage a middleware server domain via the server 102. A middleware server domain may be a logically related group of middleware server resources that managed as a unit. A middleware server domain may comprise the server 102 and one or more managed servers. The managed servers may be standalone devices and/or collected devices in a server cluster. The server cluster may be a group of managed servers that work together to provide scalability and higher availability for the applications 104. In this regard, the applications 104 are developed and deployed as part of at least one domain. In other embodiments, one instance of the managed servers in the middleware server domain may be configured as the server 102. The server 102 provides a central point for managing and configure the managed servers, any of the one or more applications 104, and the one or more local applications 184.

The at least one server processor 126 may comprise one or more processors communicatively coupled to the memory 130. The server processor 126 may be any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The server processor 126 may be a programmable logic device, a microcontroller, a microprocessor, or any suitable combination of the preceding. The one or more server processors 126 may be configured to process data and may be implemented in hardware or software executed by hardware. For example, the server processor 126 may be 8-bit, 16-bit, 32-bit, 64-bit or of any other suitable architecture. The server processor 126 may include an arithmetic logic unit (ALU) for performing arithmetic and logic operations, processor registers that supply operands to the ALU and store the results of ALU operations, and a control unit that fetches the instructions 132 from the memory 130 and executes them by directing the coordinated operations of the ALU, registers and other components. In this regard, the one or more server processors 126 are configured to execute various instructions. For example, the one or more server processors 126 are configured to execute the instructions 132 to implement the functions disclosed herein, such as some or all of those described with respect to FIGS. 1 and 2. In some embodiments, the functions described herein are implemented using logic units, FPGAs, ASICs, DSPs, or any other suitable hardware or electronic circuitry.

In one or more embodiments, the server T/O interfaces 120 may be any suitable hardware and/or software to facilitate any suitable type of wireless and/or wired connection. These connections may include, but not be limited to, all or a portion of network connections coupled to the Internet, an Intranet, a private network, a public network, a peer-to-peer network, the public switched telephone network, a cellular network, a local area network (LAN), a metropolitan area network (MAN), a wide area network (WAN), and a satellite network. The server I/O interfaces 120 may be configured to support any suitable type of communication protocol as would be appreciated by one of ordinary skill in the art.

The memory 130 may be volatile or non-volatile and may comprise a read-only memory (ROM), random-access memory (RAM), ternary content-addressable memory (TCAM), dynamic random-access memory (DRAM), and static random-access memory (SRAM). The memory 130 may be implemented using one or more disks, tape drives, solid-state drives, and/or the like. The memory 130 is operable to store the instructions 132, the one or more entitlements 134, the one or more obfuscation operations 136, the one or more application operations 138, the one or more applications 104, the one or more representative applications 140, the one or more expected application responses 142, the one or more simulated application responses 144, the simulation information 146, the application data 148, the one or more data types 150 comprising the user data 152 and the one or more identification (ID) numbers 154, the one or more simulation environments 155, the one or more application configuration parameters 156, the one or more modification suggestions 158, the one or more ML algorithms 160, the one or more AI commands 162, the one or more rules and policies 164, and the one or more reports 166, and/or any other data or instructions. The instructions 132 may comprise any suitable set of instructions, logic, rules, or code operable to execute the server processor 126.

In one or more embodiments, the entitlements 134 may indicate that a given user device 106 is allowed to access one or more network resources in accordance with the one or more rules and policies 164. The entitlements 134 may indicate that a given user device 106 is allowed to perform one or more operations in the system 100 (e.g., receive specific application access to one of the user devices 106). To secure or protect operations of user device 106 from bad actors, the entitlements 134 may be assigned to a given user device profile in accordance with updated security information, which may provide guidance parameters to the use of the entitlements 134 based at least upon corresponding rules and policies 164. The rules and policies 164 may be security configuration commands or regulatory operations predefined by an organization or one or more users 115. In one or more embodiments, the rules and policies 164 may be dynamically defined by the one or more users 115. The rules and policies 164 may be prioritization rules configured to instruct one or more user devices 106 to establish one or more application configuration parameters 156 or perform one or more application operations 138 in the system 100 in a specific order. The one or more rules and policies 164 may be predetermined or dynamically assigned by a corresponding user 115 or an organization associated with the user 115.

The obfuscation operations 136 may be one or more operations configured to mask, obfuscate, and/or replace application data 148 into simulation information 146 as the application data 148 is copied along an application 104 into a corresponding representative application 140. The server 102 may be configured to copy a specific application 104 into a simulation environment 155 as a corresponding representative application 140. The simulation information 146 may be replacement data of a same data type 150 of any corresponding application data 148. In this regard, the simulation information 146 may comprise data matching data types 150 in the application data 148. In some embodiments, the application data 148 is masked, obfuscated, and/or replaced with simulation information to match a corresponding data type format. For example, if the application data 148 comprises user data including user addresses, then the simulation information 146 may be generated by the server 102 to include randomized words in address formats. In this example, if a street address in the application data 148 is "1234 Example Street," then a street address in the simulated information 146 may be "9319 Address Street." The application data 148 may be masked, obfuscated, and/or replaced in accordance with one or more rules and policies 164. The rules and policies 164 may indicate a format, order, and/or configuration parameters to follow while masking, obfuscating, and/or replacing the application data 148 as part of the obfuscation operations 136.

In one or more embodiments, the application data 148 may be masked, obfuscated, and/or replaced based on different data types 150. For example, user data 152 comprising names may be replaced with names from public domain media (e.g., movies and books among others), names of constellations, and the like. In another example, ID numbers 154 may be randomized. At this stage, the server 102 may be configured to discard real data forensically to cleanse the simulation environment 155 by removing all application data 148 from the representative applications 140.

In one or more embodiments, the application operations 138 are operational files comprising configuration parameters to perform one or more tasks at the server 102. The application operations 138 may be configured to enable multiple middleware operations in the system 100. In some embodiments, the application operations 138 enable the server 102 to perform operations as an application programing interface (API), an application server running enterprise applications, an application integration server, a content-centric middleware server, a data integration server, or a device middleware server. The application operations 138 may maintain information associated with tracking time, an increasing counter, or a number of instances lapsed during pauses of operations in the server 102. In one or more embodiments, the application operations 138 comprise information concerning any use of the applications 104 associated with operations caused by the server 102. The application operations 138 may indicate an active state or an inactive state depending on whether a given application 104 is expected to run on the server 102. Each installed application 104 may be an operation performed by the server 102. Further, each application 104 may be executed using the server 102 and the databases 118. In some embodiments the application operations 138 comprise one or more production (PROD) environment operations. The application operations 138 may be one or more operations performed in a representative application 140.

In some embodiments, the application configuration parameters 156 provide triggers in the form of communication or control signals to start operations such as fetching the instructions 132 or running one or more scripts. The application operations 138 and the application configuration parameters 156 may provide service information data indicating any services (e.g., one or more of the applications 104) available in the server 102 and the user devices 106. The application operations 138 and the application configuration parameters 156 may provide lists, security information, and configuration parameters that the server 102 uses to set up a specific application 104. The application operations 138 and the application configuration parameters 156 may be configuration data that provides starting procedure configuration to the server 102. In one or more embodiments, the application configuration parameters 156 may be optimized instructions that enable establishing of a specific procedure in the middleware server domain. In the example of FIG. 1, the application configuration parameters 156 comprise performing application installation operations configured to install multiple middleware scripts the server 102.

In one or more embodiments, the application data 148 is information data representative on one or more applications 104. The application data 148 may be data that extrapolates or summarizes application traffic information associated with one or more applications 104. In the example of FIG. 1, the applications 104 comprise an application 104*a*, an application 104*b*, and an application 104*c* among others. The applications 104 in the server 102 may comprise less or more applications 104 than those shown in FIG. 1. The application data 148 may be active metadata comprising business metadata and/or passive metadata comprising technical metadata.

In one or more embodiments, the ML algorithm 160 may be executed by the server processor 126 to evaluate the application data 148 and/or perform one or more of the obfuscation operations 136 in accordance with one or more ML models. Further, the ML algorithm 160 may be configured to interpret and transform the application data 148 into structured data sets and subsequently stored as files or tables. The ML algorithm 160 may cleanse, normalize raw data, and derive intermediate data to generate uniform data in terms of encoding, format, and data types. The ML algorithm 160 may be executed to run user queries and advanced analytical tools on the structured data. The ML algorithm 160 may be configured to generate the one or more AI commands 162 based on a current application 104 and the existing application configuration parameters 156. In turn, the server processor 126 may be configured to generate the possible modification suggestions 158 and the reports 166 based on the outputs of the ML algorithm 160. The AI commands 162 may be parameters that modify the possible modification suggestions 158 and the reports 166. The AI commands 162 may be combined with the existing application configuration parameters 156 to create the possible modification suggestions 158 and the reports 166. In one or more embodiments, the possible modification suggestions 158 may be dynamically generated updates for the existing application configuration parameters 156.

The representative applications 140 may be clones and/or copies of the one or more applications 104. In the example of FIG. 1, the representative applications 140 comprise a representative application 140*a*, a representative application 140*b*, and a representative application 140*c* among others. The representative applications 140 may comprise less or more application copies than those shown in FIG. 1. Each of the representative applications 140 may be associated to a corresponding version ID. The representative applications 140 may form a copy of a corresponding application 104 and include any application data 148 as simulation information 146 to simulate one or more application operations 138. One or more simulated application responses 144 generated by the representative applications 140 may be evaluated while performing one or more application operations 138. In some embodiments, the simulated application responses 144 may be compared to one or more of the expected application responses 142 to determine whether the representative applications 140 are performed as expected. For example, the representative application 140*a* may be a copy that is generated based on the analysis of the application metadata associated with the application 104*a*. In this regard, the representative application 140*a* may be an isolated virtual representation of the application 104*a* and configured to simulate the one or more application operations 138 without impacting the application 104*a*.

In some embodiments, the simulated environment 155 may be a sandbox environment in which the one or more representative applications 140 are configured to operate. In some embodiments, the simulated environment may comprise one or more of the representative applications 140 and one or more tools to manipulate and/or modify simulation information 146 in the representative applications 140. The one or more representative applications 140 may be one or more copies of PROD release versions of one or more of the applications 104. In one or more embodiments, the server 102 may comprise less of more representative applications 104 than those shown in FIG. 1. Further, a number of the applications 104 may be equal or different than a number of the representative applications 140.

In one or more embodiments, the databases 118 may be one of the server databases 118 in one of the managed servers. In one example, the server 102 may determine the server processor 126 is available (e.g., running) to perform a specific application 104. In another example, the server 102 may determine that a specific managed server is running to perform the specific application 104 upon receiving a server response indicating that a corresponding managed server is available to perform the application 104. In one or more embodiments, the server 102 may determine whether a device processor 174 is available (e.g., running) to perform one or more specific local applications 184. In yet another example, the server 102 may determine that the databases 118 are running to provide memory resources to execute the application 104 upon receiving a database response indicating that the databases 118 are available to provide memory resources to execute the applications 104. In one or more embodiments, the server 102 may determine whether the databases 118 are available (e.g., running) and may provide the database response. In one or more embodiments, one of the managed servers may determine whether the corresponding server databases 118 are available (e.g., running) and may provide the database response.

The possible modification suggestions 158 may be recommendations presented to the user devices 106 based on the expected application responses 142 and the simulated application responses 144. The possible modification suggestions 158 may comprise one or more dynamic configuration commands to modify the one or more entitlements 134. In one or more embodiments, the dynamic configuration commands may comprise the one or more application configuration parameters 156 configured to control operations of the applications 104 and/or the representative applications 140. Each configuration command of the application configuration parameters 156 may be configured to dynamically provide control information to perform one or more of the operations based at least in part upon the analyzed data from the application data 148. The possible modification suggestions 158 provide preventive solutions to changes in a release that may cause unintended impacts to the applications 104. In any integrated system where multiple applications 104 interact with each other, the system 100 may thoroughly perform impact checks of any changes to operations and whether modifications are needed to ensure any change is not impacting performance of the applications 104 upstream/downstream.

In one or more embodiments, the reports 166 may comprise a release roadmap to incorporate the one or more possible modification suggestions 158 into the application configuration parameters 156 and possible impacts that may be mitigated by the possible modification suggestions 158 in releases of the application 104. The possible impacts to the application to be caused by the possible modification suggestions 158 may comprise possible changes to an application information flow and an application version tracking (i.e., the version IDs). In some embodiments, the reports 166 may be generated to indicate one or more instructions 132 to incorporate the one or more possible modification suggestions 158 into the application configuration parameters 146 of the PROD release version of a specific application 104 and cause the system 100 to delete any representative applications 140 generated.

In one or more embodiments, the reports 166 may be configured to output and auto-generated release plans with estimated deployment cycle metrices such as timing issues. The system 100 may be configured to plan the releases of the given application 104 with minimal issues and automated environment and operational comparisons to establish deployment stability. Once the differences are resolved in the simulation environment 155 for a given representative application 140, the representative applications 140 may be deleted or purged. This approach provides minimal impact to cloud or overall distributed system for any changes in the applications 104, fixing the deployment issues right at the point of issue occurrence, and validating overall impact of the changes. For any similar deployments and/or upgrades, previous versions (i.e., with older version IDs) of the representative applications 140 may be referred for evaluation with ease.

Network

The network 110 facilitates communication between and amongst the various devices of the system 100. The network 110 may be any suitable network operable to facilitate communication between the server 102 and the user devices 106 of the system 100. The network 110 may include any interconnecting system capable of transmitting audio, video, signals, data, data packets, messages, or any combination of the preceding. The network 110 may include all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the devices.

User Devices

In one or more embodiments, each of the user devices 106 (e.g., the user devices 106*a*-106*g*) may be any computing device configured to communicate with other devices, such as the server 102, other user devices 106 in the user device groups 112*a* and 112*b*, databases, and the like in the system 100. Each of the user devices 106 may be configured to perform specific functions described herein and interact with one or more user devices 106*a*-106*g* in the device groups 112. Examples of the user devices 106 comprise, but are not limited to, a laptop, a computer, a smartphone, a tablet, a smart device, an IoT device, a simulated reality device, an augmented reality device, or any other suitable type of device.

The user devices 106 may be hardware configured to create, transmit, and/or receive information. The user devices 106 may be configured to receive inputs from a user, process the inputs, and generate data information or command information in response. The data information may include documents or files generated using a user interface. The command information may include input selections/commands triggered by a user using a peripheral component or one or more device peripherals 172 (i.e., a keyboard) or an integrated input system (i.e., a touchscreen presenting a user interface). The user devices 106 may be communicatively coupled to the server 102 via a network connection (i.e., device interface 170 in the server 102). The user devices 106 may transmit and receive data information, command information, or a combination of both to and from the server 102 via the device interface 170. In one or more embodiments, the user devices 106 is configured to exchange data, commands, and signaling with the server 102. In some embodiments, the user devices 106 are configured to trigger the start of one or more communication operations. The user devices 106 may be configured to trigger network devices to perform one or more communication operations. In one or more embodiments, while FIG. 1 shows the user device 106*b*, the user device 106*c*, and the user device 106*d*, a given user group 112*a* may comprise less or more user devices 106.

In one or more embodiments, referring to the user device 106*a* as a non-limiting example of the user devices 106, the user device 106*a* may comprise one or more device interfaces 170, one or more device peripherals 172, a device processor 174, and a device memory 176. The device interfaces 170 may be any suitable hardware or software (e.g., executed by hardware) to facilitate any suitable type of communication in wireless or wired connections. These connections may comprise, but not be limited to, all or a portion of network connections coupled to additional user devices 106*b*-106*g*, the server 102, the Internet, an Intranet, a private network, a public network, a peer-to-peer network, the public switched telephone network, a cellular network, a LAN, a MAN, a WAN, and a satellite network. The device interfaces 170 may be configured to support any suitable type of communication protocol.

In one or more embodiments, the one or more device peripherals 171 may comprise audio devices (e.g., speaker, microphones, and the like), input devices (e.g., keyboard, mouse, and the like), or any suitable electronic component that may provide a modifying or triggering input to the user device 106*a*. For example, the one or more device peripherals 171 may be speakers configured to release audio signals (e.g., voice signals or commands) during media playback operations. In another example, the one or more device peripherals 171 may be microphones configured to capture audio signals from the user 115*a*. In one or more embodiments, the one or more device peripherals 172 may be configured to operate continuously, at predetermined time periods or intervals, or on-demand.

The device processor 174 may comprise one or more processors communicatively coupled to and in signal communication with the device interfaces 170, the device peripherals 172, and the device memory 176. The device processor 174 is any electronic circuitry, including, but not limited to, state machines, one or more CPU chips, logic units, cores (e.g., a multi-core processor), FPGAs, ASICs, or DSPs. The device processor 174 may be a programmable logic device, a microcontroller, a microprocessor, or any suitable combination of the preceding. The one or more processors in the device processor 174 are configured to process data and may be implemented in hardware or software executed by hardware. For example, the device processor 174 may be an 8-bit, a 16-bit, a 32-bit, a 64-bit, or any other suitable architecture. The device processor 174 comprises an ALU to perform arithmetic and logic operations, processor registers that supply operands to the ALU, and store the results of ALU operations, and a control unit that fetches software instructions such as device instructions 180 from the device memory 176 and executes the device instructions 180 by directing the coordinated operations of the ALU, registers, and other components via a device processing engine (not shown). The device processor 174 may be configured to execute various instructions. For example, the device processor 174 may be configured to execute the device instructions 180 to implement functions or perform operations disclosed herein, such as some or all of those described with respect to FIGS. 1 and 2. In some embodiments, the functions described herein are implemented using logic units, FPGAs, ASICs, DSPs, or any other suitable hardware or electronic circuitry.

In one or more embodiments, the device memory 176 may comprise multiple local operation data 182 and one or more local applications 184 associated with the server 102. The local operation data 182 may be data configured to enable one or more data processing operations such as those described in relation with the server 102. The local operation data 182 may be partially or completely different from those comprised in the memory 130. The local applications 184 may be one or more of the services described in relation with the server 102. In some embodiments, the local applications 184 may be partially or completely different from those comprised in the memory 130.

Operational Flow Overview

In one or more embodiments, the system 100 is configured to dynamically analyze representative application data (e.g., simulation information 146). The server 102 may be configured to execute one or more ML algorithms 160 and use one or more AI commands 162 to virtualize applications 104 in a production (PROD) release. In particular, the server 102 may be configured to virtualize each application 104 in a PROD release into a simulation environment 155 (e.g., a virtual machine) to perform one or more application operations 138 without impacting the PROD release of the application 104. The one or more application operations 138 may be PROD environment operations. The server 102 may be configured to perform the PROD operations in the simulation environment 155 instead of analyzing lower-level environment (LLE) release data and/or affecting PROD release data. In some embodiments, application penetration tests performed using PROD release data may be configured to identify true vulnerabilities in applications because versions of applications 104 evaluated include PROD environment configurations.

In one or more embodiments, the server 102 may be configured to copy a PORD release version of an application 104 onto a simulation environment 155. The copy of the PROD release version may comprise PROD release data (e.g., application data 148). At this stage, the server 102 may be configured to mask, obfuscate, and/or replace the application data 148 with corresponding simulation information 146. The simulation information 146 may comprise data representative of the application data 148. As described above, the simulation information 146 may comprise data matching data types 150 in the application data 148. In some embodiments, the application data 148 is masked, obfuscated, and/or replaced with simulation information 146 as part of the one or more obfuscation operations 136.

Process to Dynamically Analyze Representative Application Data

FIG. 2 illustrates an example flowchart of a process 200 to dynamically analyze representative application data, in accordance with one or more embodiments. Modifications, additions, or omissions may be made to the process 200. The process 200 may comprise more, fewer, or other operations than those shown below. For example, operations may be performed in parallel or in any suitable order. While at times discussed as the server 102, or components of any of thereof performing operations described in the operations 202-240, any suitable system or components of the s system 100 may perform one or more operations of the process 200. For example, one or more operations of the process 200 may be implemented, at least in part, in the form of instructions 132 of FIG. 1, stored on non-transitory, tangible, machine-readable media (e.g., the server memory 130 or non-transitory computer readable medium storing the instructions 132 of FIG. 1) that when run by one or more processors (e.g., the server processor 126 of FIG. 1) may cause the one or more processors to perform operations described in the operations 202-240.

In one or more embodiments, the server 102 is configured to obtain application data 148 and multiple expected application responses 142 of an application 104*a*. Herein, the application 104 and a corresponding representative application 140*a* are used as non-limiting examples. The application 104*a* may comprise application data 148. At operation 204, the server 102 generates the representative application 140*a* in a simulation environment 155 based on the application data 148. The representative application 140*a* may include application information (e.g., application data 148) of one or more data types 150. The server 102 may be configured to generate the representative application 140*a* in the simulation environment 155 based at least in part upon application data 148 of the application 104*a*. The representative application 140*a* may be an isolated virtual representation of the application 104*a*. The representative application 140*a* may comprise application information of at least one data type 150. The representative application 140*a* is configured to simulate one or more application operations 138 without impacting the application 104*a*. At operation 206, the server 102 execute an ML algorithm 160 to perform one or more obfuscation operations 136 of the application information. In response to generating the representative application 140*a*, the server 102 is configured to execute the ML algorithm 160 to perform one or more operations comprising performing the one or more obfuscation operations 136 configured to at least partially replace the application information with corresponding simulation information 146 of a same data type 150. At operation 208, the server 102 is configured to purge the application information from the simulation environment 155. The server may be configured to purge the application information from the simulation environment 155 after multiple obfuscation operations 136 remove any application data 148 from the simulation information 146. At operation 210, the server 102 simulate multiple application operations by the first representative application. The server 102 may be configured to simulate one or more application operations 138 by the representative application 140*a* using the simulation information 146. At operation 212, the server 102 monitor multiple simulated application responses 144 during simulation of the application operations 138.

The process 200 proceeds to operation 220, where the server 102 determines whether outputs in the simulated application responses 144 match outputs in the expected application responses 142. In response to monitoring the simulated application responses 144 during simulation of the application operations 138 on the representative application 140*a* in the simulation environment 155, the server 102 is configured to determine whether the simulated application responses 144 comprises an output that is at least partially different from any of those in the expected application responses 142. If the server 102 determines that the simulated application responses 144 comprise the same (i.e., not at least partially different) outputs of the expected application responses 142 (e.g., NO), the process 200 proceeds to operation 222. At operation 222, the server 102 is configured to generate a report 166 indicating that no modifications to the application 104*a* are suggested. If the server 102 determines that the simulated application responses 144 are at least partially different from the expected application responses 142 (e.g., YES), the process 200 proceeds to operation 232. At operation 232, the server 102 is configured to determine at least one modification suggestion 158 to multiple application configuration parameters 156 configured to inhibit unexpected outputs. In particular, in response to determining the output, the server 102 may be configured to determine the at least one modification suggestion 158 to the application configuration parameters 156 of the application 104 configured to inhibit the output. At operation 234, the server 102 may be configured to generate a report 166 indicating one or more instructions 132 to incorporate the possible modification suggestion 158 into the application configuration parameters 156.

The process 200 may end at operation 240, where the server 102 may delete the representative application 140. The server 102 may be configured to delete the representative application 140*a* in conjunction with generating the report 166 indicating the one or more instructions 132 to incorporate the modification suggestion 158 into the application configuration parameters 156.

In one or more embodiments, the process 200 may be reiterated for a same application 104*a* at different points in time. The process may be performed for multiple data types 150. For example, the process 200 may be performed to mask, obfuscate, and/or replace user data 152 comprising name information and/or user data 152 of user profiles associated with the application 104*a* among others. In this example, the server 102 may be configured to obtain randomized names from a randomized name database and replace each instance of the user data 152 with a corresponding instance of the randomized names. In another example, the process 200 may be performed to mask, obfuscate, and/or replace user ID numbers 154 associated with the application 104*a*. In this example, the server 102 may be configured to scramble the user ID numbers 154 into randomized ID numbers. Each of the user ID numbers 154 (e.g., from the application data 148) being scrambled into a corresponding randomized ID number (e.g., to the simulation information 146).

In one or more embodiments, after a first report 166 is generated, the server 102 is configured to determine whether a predefined time duration (e.g., a timer) is lapsed. In response to determining that the predefined time duration is lapsed, the server 102 may be configured to generate a new representative application 104*b* for the same application 104*a*. Further, the new representative application 104*b* may be generated dynamically after identifying a change in the PROD release version of the application 104*a*.

SCOPE OF THE DISCLOSURE

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus, comprising:
a memory that stores:
application data of an application comprising one or more application data types;
a machine learning algorithm configured to evaluate the application data in accordance with one or more machine learning models; and
a plurality of expected application responses comprising one or more expected outputs of one or more application operations to be performed by the application; and
a processor communicatively coupled to the memory and configured to:
generate a first representative application in a simulation environment based at least in part upon the application data, wherein:
the first representative application is a first isolated virtual representation of the application;
the first representative application comprises first application information of a first data type; and
the first representative application is configured to simulate one or more first application operations without impacting the application;
in response to generating the first representative application, execute the machine learning algorithm to generate one or more artificial intelligence (AI) commands based on the application and a plurality of application configuration parameters, and to use the one or more AI commands to:
perform one or more first obfuscation operations configured to at least partially replace the first application information with first simulation information of the first data type;
purge the first application information from the simulation environment;
simulate a first plurality of application operations by the first representative application using the first simulation information;
monitor a first plurality of simulated application responses during simulation of the first plurality of application operations;
in response to monitoring the first plurality of simulated application responses during simulation of the first plurality of application operations, determine whether the first plurality of simulated application responses comprises a first output that is different from any expected outputs in the plurality of expected application responses; and
in response to determining the first output, determine a first modification suggestion to a plurality of application configuration parameters of the application configured to inhibit the first output; and
generate a first report indicating one or more first instructions to incorporate the first modification suggestion into the plurality of application configuration parameters.

2. The apparatus of claim 1, wherein the processor is further configured to:
generate a second representative application in the simulation environment based at least in part upon the application data, wherein:
the second representative application is a second isolated virtual representation of the application;
the second representative application comprises second application information of the first data type; and
the second representative application is configured to simulate one or more second application operations without impacting the application;
in response to generating the second representative application, execute the machine learning algorithm to:
perform one or more second obfuscation operations configured to at least partially replace the second application information with second simulation information of the first data type;
purge the second application information from the simulation environment;
simulate a second plurality of application operations by the second representative application using the second simulation information;
monitor a second plurality of simulated application responses during simulation of the second plurality of application operations;
in response to monitoring the second plurality of simulated application responses during simulation of the second plurality of application operations, determine whether the second plurality of simulated application responses comprises a second output that is different from any expected outputs of those in the plurality of expected application responses; and
in response to determining the second output, determine a second modification suggestion to the plurality of application configuration parameters of the application configured to inhibit the second output; and
generate a second report indicating one or more second instructions to incorporate the second modification suggestion into the plurality of application configuration parameters.

3. The apparatus of claim 1, wherein the processor is further configured to:
generate a second representative application in the simulation environment based at least in part upon the application data, wherein:
the second representative application is a second isolated virtual representation of the application;
the second representative application comprises second application information of the first data type;
the second representative application comprises third application information of a second data type; and
the second representative application is configured to simulate one or more second application operations without impacting the application;
in response to generating the second representative application, execute the machine learning algorithm to:
perform one or more second obfuscation operations configured to at least partially replace the second application information with second simulation information of the first data type;
perform one or more third obfuscation operations configured to at least partially replace the third application information with third simulation information of the second data type;

purge the second application information and the third application information from the simulation environment;

simulate a second plurality of application operations by the second representative application using the second simulation information and the third simulation information;

monitor a second plurality of simulated application responses during simulation of the second plurality of application operations;

in response to monitoring the second plurality of simulated application responses during simulation of the second plurality of application operations, determine whether the second plurality of simulated application responses comprises a second output that is different from any expected outputs in the plurality of expected application responses; and in response to determining the second output, determine a second modification suggestion to the plurality of application configuration parameters of the application configured to inhibit the second output; and generate a second report indicating one or more second instructions to incorporate the second modification suggestion into the plurality of application configuration parameters.

4. The apparatus of claim 3, wherein:

the first data type comprises name information;

the first application information comprises user data associated with the application; and in conjunction with the one or more first obfuscation operations, the processor is further configured to:

obtain randomized names from a randomized name database; and replace each instance of the user data with a corresponding instance of the randomized names.

5. The apparatus of claim 3, wherein:

the first data type comprises a plurality of identification (ID) numbers;

the first application information comprises a plurality of user ID numbers of user profiles associated with the application; and in conjunction with the one or more first obfuscation operations, the processor is further configured to:

scramble the plurality of user ID numbers into a plurality of randomized ID numbers, each of the plurality of user ID numbers being scrambled into a corresponding randomized ID number of the plurality of randomized ID numbers; and in response to scrambling the plurality of user ID numbers into the plurality of randomized ID numbers, replace each instance of the plurality of user ID numbers with a corresponding instance of the plurality of randomized ID numbers.

6. The apparatus of claim 3, wherein the processor is further configured to:

after the first report is generated, determine whether a predefined time duration is lapsed; and in response to determining that the predefined time duration is lapsed, generate the second representative application.

7. The apparatus of claim 3, wherein the processor is further configured to:

after the first report is generated, determine whether the application is updated; and in response to determining that the application is updated, generate the second representative application.

8. The apparatus of claim 1, wherein:

the simulation environment is a virtual machine environment configured in accordance with production (PROD) configuration parameters; and the first plurality of application operations is a plurality of PROD environment operations.

9. The apparatus of claim 1, wherein the processor is further configured to:

in conjunction with generating the first report indicating the one or more first instructions to incorporate the first modification suggestion into the plurality of application configuration parameters, delete the first representative application.

10. A method, comprising:

generating a first representative application in a simulation environment based at least in part upon application data of an application, wherein:

the first representative application is a first isolated virtual representation of the application;

the first representative application comprises first application information of a first data type; and the first representative application is configured to simulate one or more first application operations without impacting the application;

in response to generating the first representative application, executing a machine learning algorithm to generate one or more artificial intelligence (AI) commands based on the application and a plurality of application configuration parameters, and using the one or more AI commands to perform one or more operations comprising:

performing one or more first obfuscation operations configured to at least partially replace the first application information with first simulation information of the first data type;

purging the first application information from the simulation environment;

simulating a first plurality of application operations by the first representative application using the first simulation information;

monitoring a first plurality of simulated application responses during simulation of the first plurality of application operations;

in response to monitoring the first plurality of simulated application responses during simulation of the first plurality of application operations, determining whether the first plurality of simulated application responses comprises a first output that is different from any expected outputs in a plurality of expected application responses; and in response to determining the first output, determining a first modification suggestion to a plurality of application configuration parameters of the application configured to inhibit the first output; and generating a first report indicating one or more first instructions to incorporate the first modification suggestion into the plurality of application configuration parameters.

11. The method of claim 10, further comprising:

generating a second representative application in the simulation environment based at least in part upon the application data, wherein:

the second representative application is a second isolated virtual representation of the application;

the second representative application comprises second application information of the first data type; and the second representative application is configured to simulate one or more second application operations without impacting the application;

in response to generating the second representative application, executing the machine learning algorithm to perform one or more additional operations comprising:

performing one or more second obfuscation operations configured to at least partially replace the second application information with second simulation information of the first data type;

purging the second application information from the simulation environment;

simulating a second plurality of application operations by the second representative application using the second simulation information;

monitoring a second plurality of simulated application responses during simulation of the second plurality of application operations;

in response to monitoring the second plurality of simulated application responses during simulation of the second plurality of application operations, determining whether the second plurality of simulated application responses comprises a second output that is different from any expected outputs in the plurality of expected application responses; and in response to determining the second output, determining a second modification suggestion to the plurality of application configuration parameters of the application configured to inhibit the second output; and generating a second report indicating one or more second instructions to incorporate the second modification suggestion into the plurality of application configuration parameters.

12. The method of claim 10, further comprising:

generating a second representative application in the simulation environment based at least in part upon the application data, wherein:

the second representative application is a second isolated virtual representation of the application;

the second representative application comprises second application information of the first data type;

the second representative application comprises third application information of a second data type; and the second representative application is configured to simulate one or more second application operations without impacting the application;

in response to generating the second representative application, executing the machine learning algorithm to perform one or more additional operations comprising:

performing one or more second obfuscation operations configured to at least partially replace the second application information with second simulation information of the first data type;

performing one or more third obfuscation operations configured to at least partially replace the third application information with third simulation information of the second data type;

purging the second application information and the third application information from the simulation environment;

simulating a second plurality of application operations by the second representative application using the second simulation information and the third simulation information;

monitoring a second plurality of simulated application responses during simulation of the second plurality of application operations;

in response to monitoring the second plurality of simulated application responses during simulation of the second plurality of application operations, determining whether the second plurality of simulated application responses comprises a second output that is different from any expected outputs in the plurality of expected application responses; and in response to determining the second output, determining a second modification suggestion to the plurality of application configuration parameters of the application configured to inhibit the second output; and generating a second report indicating one or more second instructions to incorporate the second modification suggestion into the plurality of application configuration parameters.

13. The method of claim 12, wherein:

the first data type comprises name information;

the first application information comprises user data associated with the application; and the one or more first obfuscation operations comprise:

obtaining randomized names from a randomized name database; and replacing each instance of the user data with a corresponding instance of the randomized names.

14. The method of claim 12, wherein:

the first data type comprises a plurality of identification (ID) numbers;

the first application information comprises a plurality of user ID numbers of user profiles associated with the application; and the one or more first obfuscation operations comprise:

scrambling the plurality of user ID numbers into a plurality of randomized ID numbers, each of the plurality of user ID numbers being scrambled into a corresponding randomized ID number of the plurality of randomized ID numbers; and in response to scrambling the plurality of user ID numbers into the plurality of randomized ID numbers, replacing each instance of the plurality of user ID numbers with a corresponding instance of the plurality of randomized ID numbers.

15. The method of claim 12, further comprising:

after the first report is generated, determining whether a predefined time duration is lapsed; and in response to determining that the predefined time duration is lapsed, generating the second representative application.

16. A non-transitory computer readable medium storing instructions that when executed by a processor cause the processor to:

generate a first representative application in a simulation environment based at least in part upon application data of an application, wherein:

the first representative application is a first isolated virtual representation of the application;

the first representative application comprises first application information of a first data type; and the first representative application is configured to simulate one or more first application operations without impacting the application;

in response to generating the first representative application, execute a machine learning algorithm to generate one or more artificial intelligence (AI) commands based on the application and a plurality of application configuration parameters, and to use the one or more AI commands to:

perform one or more first obfuscation operations configured to at least partially replace the first application information with first simulation information of the first data type;

purge the first application information from the simulation environment;

simulate a first plurality of application operations by the first representative application using the first simulation information;

monitor a first plurality of simulated application responses during simulation of the first plurality of application operations;

in response to monitoring the first plurality of simulated application responses during simulation of the first plurality of application operations, determine whether the first plurality of simulated application responses comprises a first output that is different from any expected outputs in a plurality of expected application responses; and in response to determining the first output, determine a first modification suggestion to a plurality of application configuration parameters of the application configured to inhibit the first output; and generate a first report indicating one or more first instructions to incorporate the first modification suggestion into the plurality of application configuration parameters.

17. The non-transitory computer readable medium of claim 16, wherein the processor is further caused to:

generate a second representative application in the simulation environment based at least in part upon the application data, wherein:

the second representative application is a second isolated virtual representation of the application;

the second representative application comprises second application information of the first data type; and the second representative application is configured to simulate one or more second application operations without impacting the application;

in response to generating the second representative application, execute the machine learning algorithm to:

perform one or more second obfuscation operations configured to at least partially replace the second application information with second simulation information of the first data type;

purge the second application information from the simulation environment;

simulate a second plurality of application operations by the second representative application using the second simulation information;

monitor a second plurality of simulated application responses during simulation of the second plurality of application operations;

in response to monitoring the second plurality of simulated application responses during simulation of the second plurality of application operations, determine whether the second plurality of simulated application responses comprises a second output that is different from any expected outputs in the plurality of expected application responses; and in response to determining the second output, determine a second modification suggestion to the plurality of application configuration parameters of the application configured to inhibit the second output; and generate a second report indicating one or more second instructions to incorporate the second modification suggestion into the plurality of application configuration parameters.

18. The non-transitory computer readable medium of claim 16, wherein the processor is further caused to:

generate a second representative application in the simulation environment based at least in part upon the application data, wherein:

the second representative application is a second isolated virtual representation of the application;

the second representative application comprises second application information of the first data type;

the second representative application comprises third application information of a second data type; and the second representative application is configured to simulate one or more second application operations without impacting the application;

in response to generating the second representative application, execute the machine learning algorithm to perform one or more additional operations comprising:

perform one or more second obfuscation operations configured to at least partially replace the second application information with second simulation information of the first data type;

perform one or more third obfuscation operations configured to at least partially replace the third application information with third simulation information of the second data type;

purge the second application information and the third application information from the simulation environment;

simulate a second plurality of application operations by the second representative application using the second simulation information and the third simulation information;

monitor a second plurality of simulated application responses during simulation of the second plurality of application operations;

in response to monitoring the second plurality of simulated application responses during simulation of the second plurality of application operations, determine whether the second plurality of simulated application responses comprises a second output that is different from any expected outputs in the plurality of expected application responses; and in response to determining the second output, determine a second modification suggestion to the plurality of application configuration parameters of the application configured to inhibit the second output; and generate a second report indicating one or more second instructions to incorporate the second modification suggestion into the plurality of application configuration parameters.

19. The non-transitory computer readable medium of claim 18, wherein:

the first data type comprises name information;

the first application information comprises user data associated with the application; and in conjunction with the one or more first obfuscation operations, the processor is further caused to:

obtain randomized names from a randomized name database; and replace each instance of the user data with a corresponding instance of the randomized names.

20. The non-transitory computer readable medium of claim 18, wherein:

the first data type comprises a plurality of identification (ID) numbers;

the first application information comprises a plurality of user ID numbers of user profiles associated with the application; and in conjunction with the one or more first obfuscation operations, the processor is further caused to:

scramble the plurality of user ID numbers into a plurality of randomized ID numbers, each of the plurality of user ID numbers being scrambled into a corresponding randomized ID number of the plurality of randomized ID numbers; and in response to scrambling the plurality of user ID numbers into the plurality of randomized ID numbers, replace each instance of the plurality of user ID numbers with a corresponding instance of the plurality of randomized ID numbers.

* * * * *